United States Patent
Jaaskelainen et al.

(10) Patent No.: US 9,122,033 B2
(45) Date of Patent: Sep. 1, 2015

(54) METHOD TO INSTALL SENSING CABLES IN MONITORING WELLS

(71) Applicant: Halliburton Energy Services. Inc., Houston, TX (US)

(72) Inventors: Mikko Jaaskelainen, Katy, TX (US); Etienne Samson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 51 days.

(21) Appl. No.: 13/651,577

(22) Filed: Oct. 15, 2012

(65) Prior Publication Data

US 2014/0105533 A1 Apr. 17, 2014

(51) Int. Cl.
*G01V 1/16* (2006.01)
*G02B 6/44* (2006.01)
*F16L 1/028* (2006.01)
*G01H 9/00* (2006.01)
*E21B 43/24* (2006.01)
*G02B 6/12* (2006.01)

(52) U.S. Cl.
CPC ............... *G02B 6/443* (2013.01); *F16L 1/028* (2013.01); *G01H 9/004* (2013.01); *G01V 1/168* (2013.01); *G02B 6/4415* (2013.01); *E21B 43/2401* (2013.01); *G01V 2210/1429* (2013.01); *G02B 2006/12138* (2013.01)

(58) Field of Classification Search
CPC ......... E21B 43/24; E21B 36/04; E21B 47/00; E21B 43/2401
USPC .......................................................... 385/12
See application file for complete search history.

(56) References Cited

U.S. PATENT DOCUMENTS

| | | | |
|---|---|---|---|
| 5,285,424 A | 2/1994 | Meyer | |
| 5,745,436 A * | 4/1998 | Bittleston | 367/20 |
| 6,211,964 B1 | 4/2001 | Luscombe et al. | |
| 6,230,800 B1 * | 5/2001 | Bryant | 166/250.01 |
| 7,040,402 B2 * | 5/2006 | Vercaemer | 166/253.1 |
| 7,315,666 B2 | 1/2008 | Van Der Spek | |
| 7,369,716 B2 * | 5/2008 | Berg et al. | 385/12 |
| 7,382,689 B2 * | 6/2008 | Maples et al. | 367/165 |
| 7,840,105 B2 | 11/2010 | Goldner et al. | |
| 8,384,017 B2 * | 2/2013 | Botto | 250/266 |
| 2003/0217605 A1 * | 11/2003 | Croteau et al. | 73/861.44 |
| 2004/0065437 A1 * | 4/2004 | Bostick et al. | 166/250.01 |
| 2004/0112595 A1 * | 6/2004 | Bostick et al. | 166/250.01 |
| 2006/0280412 A1 | 12/2006 | Varkey | |
| 2007/0137857 A1 * | 6/2007 | Vinegar et al. | 166/245 |
| 2007/0227760 A1 | 10/2007 | Fischer et al. | |
| 2008/0185138 A1 * | 8/2008 | Hernandez-Solis et al. | 166/60 |
| 2008/0271926 A1 * | 11/2008 | Coronado et al. | 175/323 |
| 2008/0289849 A1 | 11/2008 | Varkey et al. | |

(Continued)

FOREIGN PATENT DOCUMENTS

TW 261578 B1 * 9/2006

OTHER PUBLICATIONS

J. Mestayer, et al., Field Trials of Distributed Acoustic Sensing for Geophysical Monitoring, Symposium, 2011, SEG San Antonio 2011 Annual Meeting.

*Primary Examiner* — Charlie Y Peng
(74) *Attorney, Agent, or Firm* — Michael A. Ervin; Krueger Iselin LLP

(57) ABSTRACT

A tubular seismic sensing cable for use in wells and a method of deployment into wells to provide higher seismic sensitivity.

12 Claims, 3 Drawing Sheets

(56) References Cited

U.S. PATENT DOCUMENTS

| | | |
|---|---|---|
| 2010/0074583 A1 | 3/2010 | Varkey et al. |
| 2010/0158726 A1* | 6/2010 | Donald et al. ............... 417/437 |
| 2011/0110633 A1 | 5/2011 | Erlendsson |
| 2011/0320147 A1* | 12/2011 | Brady et al. ................... 702/66 |
| 2013/0308894 A1* | 11/2013 | Head .............................. 385/12 |

* cited by examiner

METHOD TO INSTALL SENSING CABLES IN MONITORING WELLS

CROSS-REFERENCE TO RELATED APPLICATIONS

Not applicable.

FIELD OF THE INVENTION

This disclosure relates generally to optical fibers used as sensing devices in wells and cost effective manufacturing and deployment of cables with increased sensitivity. Its application is compatible with Distributed Acoustic Sensing (DAS) Systems and other interferometric sensing systems used for seismic monitoring.

BACKGROUND OF THE INVENTION

Fiber-optic sensors are increasingly being used as devices for sensing some quantity, typically temperature or mechanical strain, but sometimes also displacements, vibrations, pressure, acceleration, rotations, or concentrations of chemical species. The general principle of such devices is that light from a laser is sent through an optical fiber and there experiences subtle changes of its parameters either in the fiber or in one or several fiber Bragg gratings and then reaches a detector arrangement which measures these changes.

The growing interest in fiber optic sensors is due to a number of inherent advantages:
  Inherently safer operation (no electrical sparks)
  Immunity from EMI (electromagnetic interference)
  Chemical passivity (not subject to corrosion)
  Wide operating temperature range (wider than most electronic devices)
  Electrically insulating (can be used in high voltage environment)

In particular a growing application field is the use of fiber optic sensing system for seismic sensing when deployed in monitoring or production wells. Such sensors are particularly attractive because more conventional seismic sensing systems are expensive to build, and in liquid environments susceptible to failure making them more expensive and difficult to maintain, Additionally, electrical seismic systems are not well suited for in-well installation due to the hostile environment (pressures, temperatures, corrosion). Fiber optic systems do not suffer many of the limitations of electronics and are thus emerging as the technology of choice. It is known that fiber optic seismic sensing cables with single point sensors have been deployed in wells.

From U.S. Pat. No. 5,285,424 it is known that air-backed hydrophones or hydrophones with compliant backing can provide greater sensitivity than hydrophones with solid backing materials. Other prior art (U.S. Pat. No. 7,840,105 B2, U.S. Pat. No. 6,211,964 B1) has shown that acoustic sensors can be built into towed arrays for seismic sensing. These solid cables though would be difficult to couple to a down hole formation—a requirement for good seismic sensitivity.

A fiber optic sensor system may include sensitive fiber optic sensors such as accelerometers, geophones, and hydrophones, which are based on interferometric principles. The method and apparatus to be described herein is completely compatible with Distributed Acoustic Sensing (DAS) systems and other interferometric sensing system used in seismic monitoring. A key design need, particularly for well formation seismic work, is for the interferometric sensing system to be closely coupled to the formation being measured while maintaining high seismic sensitivity by the presence of an inner hollow core. This close coupling for maintaining high seismic sensitivity is referred to as seismic coupling.

BRIEF SUMMARY OF THE INVENTIVE CONCEPT

The needs described are met with an system of a tubular seismic sensing cable for use in wells including at least: an inner duct cable surrounding an inner hollow core; a fiber optic sensor element helically wrapped around said inner duct cable; an outer jacket deployed around the inner duct cable and fiber optic sensor element; and a deployment method that includes at least the steps of providing the inner duct cable surrounding the inner hollow core; providing a fiber optic sensor element helically wrapped around that inner duct cable; and providing an outer jacket deployed around the inner duct cable and fiber optic sensor element so that when the tubular seismic sensing cable is deployed into a wellbore in a formation and upon reaching a required position a material that seismically couples the cable to the formation is pumped down into said hollow inner core and forced up in the annulus between the sensing cable and the formation. The material forced into in the annulus between the sensing cable and the formation then provides a solid seismic coupling of the seismic sensing cable with the formation being studied. Most of that material flows through the hollow core and into the annulus by being forced with a downward flowing liquid. That liquid remains in the hollow core until the forced seismic coupling material, is completely set in place and then is later removed—providing the hollow core for increased seismic sensitivity. Alternately the hollow core could then be filled with a compliant foam or other material with desirable compliant properties to enhance the sensitivity.

In another embodiment these needs can be met with a method for deployment of tubular sensing seismic cable for use in wells comprising the steps of: providing an inner duct cable surrounding an inner hollow core filled with a compliant foam for enhanced seismic sensitivity; providing a fiber optic sensor element helically wrapped around the inner duct cable; providing an outer jacket deployed around the inner duct cable and fiber optic sensor element; and wherein the tubular seismic sensing cable is deployed into a wellbore in a formation and upon reaching a required position a material that seismically couples the cable to the formation is pumped down on the outside surface of the tubular seismic cable to fill the annulus between the sensing cable and the formation.

The needs can also be met by a tubular seismic sensing cable for use in wells including at least an inner duct cable surrounding an inner hollow core; a fiber optic sensor element helically wrapped around the inner duct cable; and an outer jacket deployed around the inner duct cable and fiber optic sensor element. The tubular seismic sensing cable can also include a strength member interposed between the inner duct cable and the outer jacket.

DETAILED DESCRIPTION OF THE INVENTION

In the following detailed description, reference is made to accompanying drawings that illustrate embodiments of the present invention. These embodiments are described in sufficient detail to enable a person of ordinary skill in the art to practice the invention without undue experimentation. It should be understood, however, that the embodiments and examples described herein are given by way of illustration only, and not by way of limitation. Various substitutions, modifications, additions, and rearrangements may be made without departing from the spirit of the present invention. Therefore, the description that follows is not to be taken in a limited sense, and the scope of the present invention is defined only by the appended claims.

Figure 1:
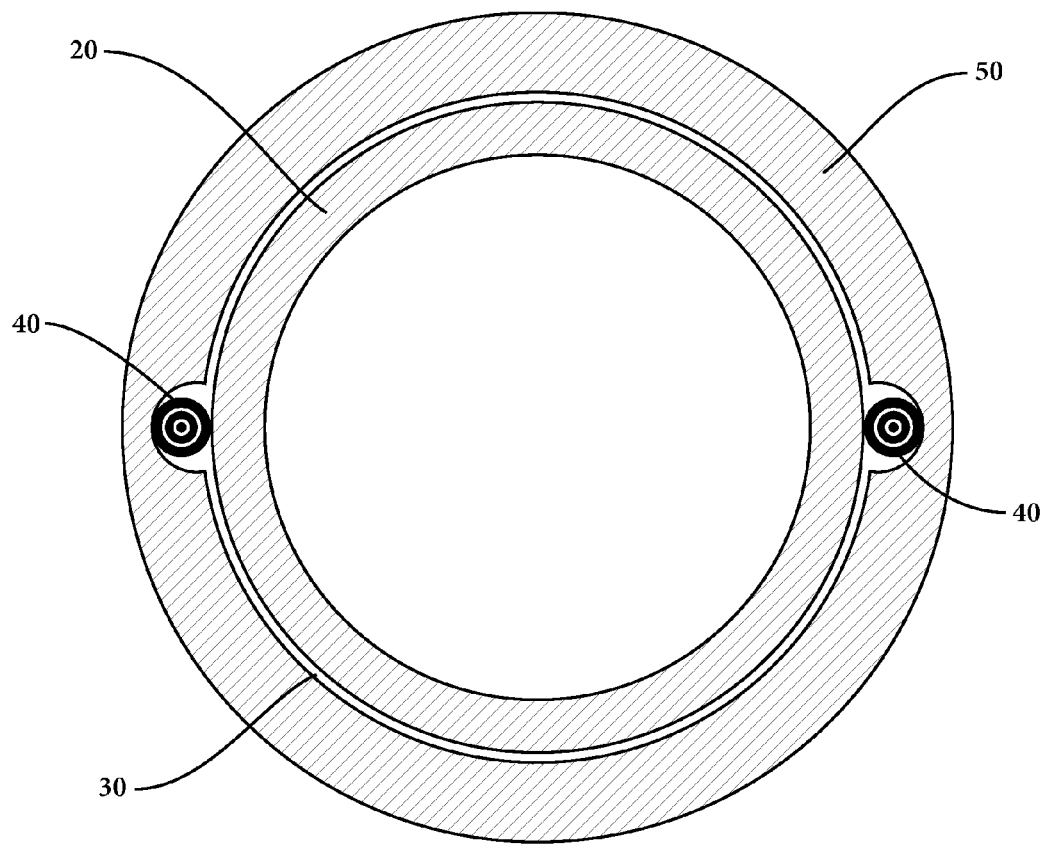
FIG. 1 illustrates the tubular seismic sensing cable of this disclosure.

FIG. 1 exhibits a tubular seismic sensing cable that can be used with an embodiment of this disclosure. An inner duct cable 20 surrounds a hollow core 15. The fiber component 40 is helically wrapped around inner duct cable 20 and is held in hard contact with inner duct cable 20 by an outer jacket 50. Between the outer jacket 50 and inner duct 20 is interposed a possible strength member 30 that can be any material that can optimize seismic impedance in the sensing cable. Strength members are added components in jacketed cables that provide extra strength and preserve integrity. Typical materials for that could be an epoxy or a gel polymer. Varying the amount of fiber wrapped around the inner duct cable can alter the sensitivity of the cable. The wrap angle (lay angle) of the optical fiber(s) can be altered and/or points with multiple closely spaced fiber wraps may be included in the sensing cable.

Additional armor can be added for mechanical protection during deployment and to avoid expansion of the cable where the helically wrapped fibers could break. The strength member may or may not be part of the cable assembly depending on the properties, as the cable materials should be selected to provide good seismic coupling to the sensing fiber. The area occupied by the strength member in FIG. 1 may be epoxy, gel, polymer or other material to optimize seismic impedance in the sensing cable. Other possibilities might include fiber-reinforced plastics with fibers such as Kevlar.

Although the dimensions are not a critical aspect of this concept—the overall diameter of a tubular seismic sensing cable can be between 5 and 8 centimeters—with a central hollow core of about 4 centimeters.

Figure 2:
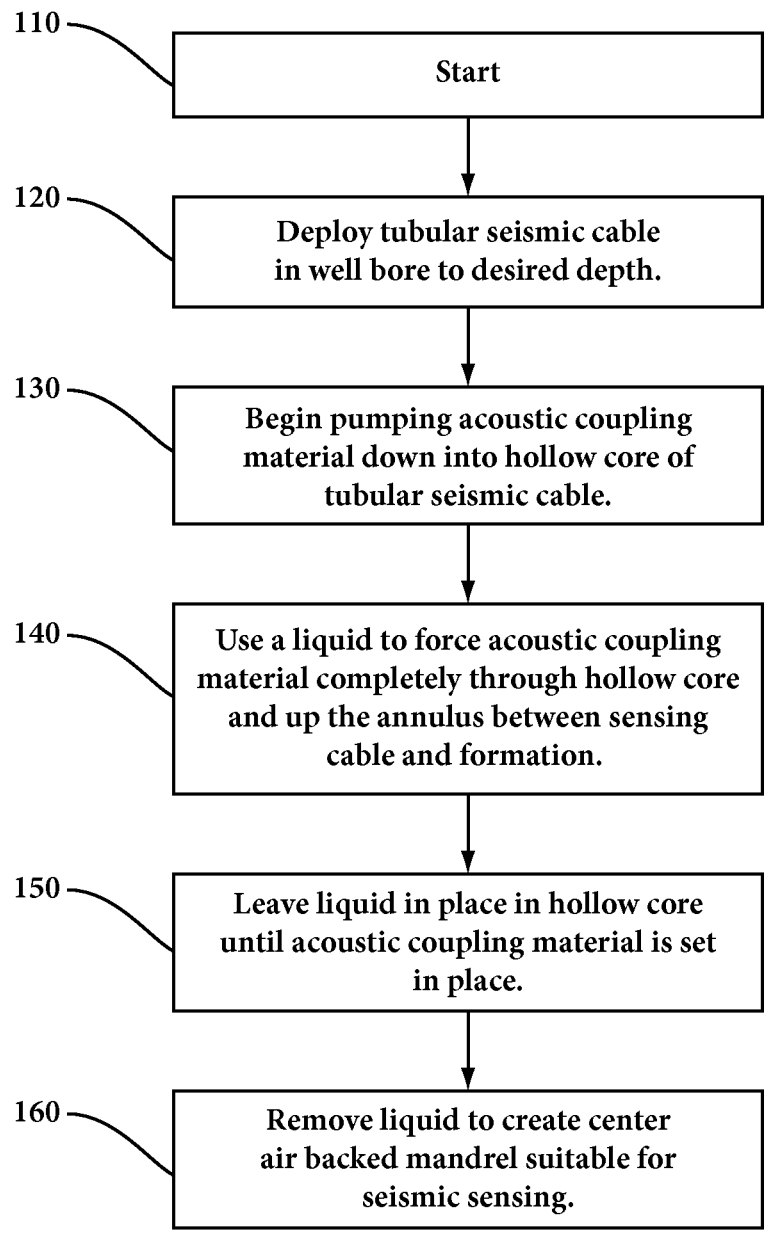
FIG. 2 is a flowchart of the method for deployment of the tubular seismic sensing cable of this disclosure.

In use the tubular seismic sensing cable can then be deployed in a wellbore using e.g. a sinker bar at the end of the cable to provide a downward force due to gravity. The methodology is shown in FIG. 2, beginning with step 110. Once the cable has reached total depth 120, a material that seismically couples the cable to the formation can be introduced. In one embodiment that material can pumped down into the hollow core of the cable 130 and be forced up in the annulus 140 between the sensing cable and formation to create good coupling for the seismic signals. The amount of this material should be such that the large majority is pushed out at the bottom of the cable and into the annulus. This can e.g. be done using a plunger or plug forced down with a liquid. The liquid would need to be left in place 150 while the material is set in place to prevent the sensing cable from collapsing. The liquid can then be pumped out 160 or otherwise removed from the hollow core to create a distributed fiber sensor with an air-backed mandrel suitable for seismic sensing. The hollow core could also be filled with compliant foam or other material with desirable seismic properties to enhance the sensitivity.

Figure 3:
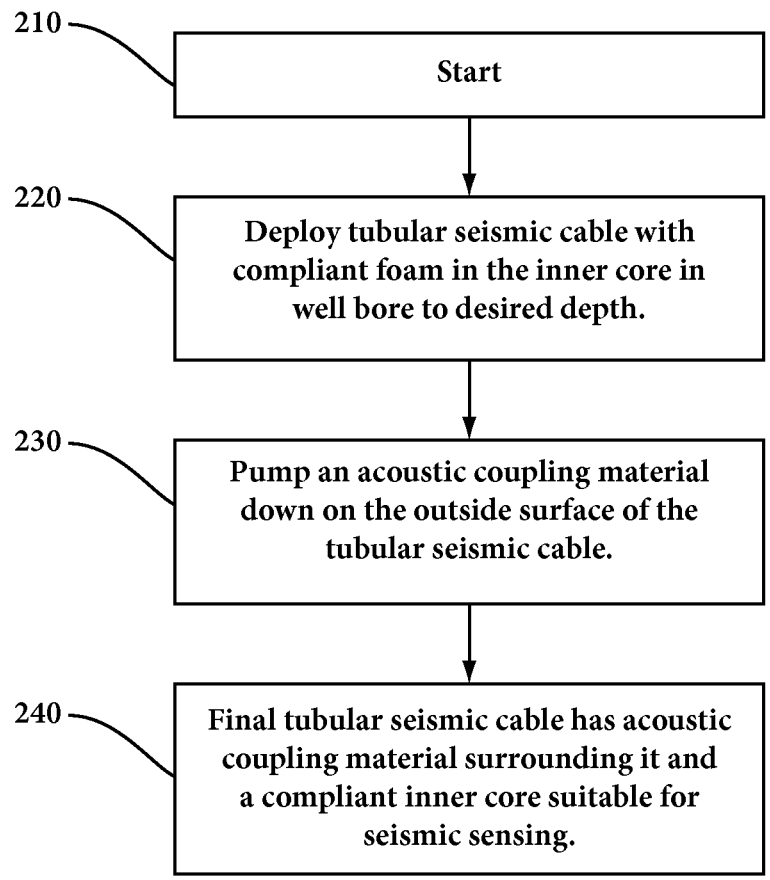
FIG. 3 is a flowchart of an alternate embodiment.

In a related but different embodiment shown in FIG. 3 the hollow core of cable 130 could be filled with compliant foam prior to deployment or after the cable has been lowered into the well. In this approach the material that seismically couples the cable to the formation can be introduced to the system by flowing it from the surface on the outside of outer jacket 50 of the tubular seismic sensing cable.

The material that seismically couples the cable to the formation can be selected to have optimum seismic impedance or have fillers to optimize the seismic impedance and thereby provide maximum signal strength in the monitoring well and system. This material could be cement.

The cable can be combined with fibers for monitoring of deformation and/or Distributed Temperature Sensing (DTS). The cable can then be used for monitoring subsidence, mechanical deformation, wellbore strain and changes to the thermal profile around production wells. Multiple fibers may be used for strain monitoring and 3 dimensional profiles of subsurface changes and strain profiles can be calculated. Examples of applications where subsidence, mechanical deformation, wellbore strain and temperature profiles are of interest include thermal recovery operations, water flood, water alternating gas (WAG), $CO_2$ injection and monitoring of hydrocarbon storage caverns.

Fiber optic sensing technologies that can be combined in the sensing cable and used for hydrocarbon optimization including but not limited to Raman, Brillouin, Rayleigh and FBG based sensing systems. The sensing systems can measure properties including but not limited to wavelength shift, phase shift and intensity changes. The overall concept solution proposed allows volume manufacturing of sensing cables suitable for seismic monitoring and the deployment method enhances the system response over existing solutions.

Although certain embodiments of the present invention and their advantages have been described herein in detail, it should be understood that various changes, substitutions and alterations can be made without departing from the spirit and scope of the invention as defined by the appended claims. Moreover, the scope of the present invention is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufactures, means, methods or steps.

We claim:

1. A method for using a tubular seismic sensing cable for use in wells comprising;
    a. providing an inner duct cable surrounding an inner hollow core;
    b. providing a fiber optic sensor element helically wrapped around said inner duct cable;
    c. providing an outer jacket deployed around the inner duct cable and fiber optic sensor element; and
    d. wherein said tubular seismic sensing cable is deployed into a wellbore in a formation and upon reaching a required position a material that seismically couples the cable to the formation is pumped down into said hollow inner core and forced up in the annulus between the sensing cable and the formation.

2. The method for using a tubular seismic sensing cable for use in wells of claim 1 wherein said deployment is aided by a sinker bar at the end of the cable to provide a downward force due to gravity.

3. The method for using a tubular seismic sensing for use in wells of claim 1 wherein said material that seismically couples the cable to the formation is pumped down into said hollow inner core by a plunger forced down with a liquid.

4. The method for using a tubular seismic sensing cable for use in wells of claim 1 wherein said material that seismically couples the cable to the formation is substantially pushed out of the inner hollow core and into said annulus.

5. The method for using a tubular seismic sensing cable for use in wells of claim 3 wherein said liquid is left in place in said inner hollow core while said material that seismically couples the cable to the formation is set in place.

6. The method for using a tubular seismic sensing cable for use in wells of claim 1 wherein said material that seismically couples the cable to the formation is cement.

7. The method for using a tubular seismic sensing cable for use in wells of claim 1 wherein said material that seismically couples the cable to the formation additionally comprises fillers to optimize the seismic impedance and thereby provide maximum signal strength in the monitoring well and system.

8. The method for using a tubular seismic sensing cable for use in wells of claim 5 wherein said liquid is later removed to create a hollow core with an air-backed mandrel suitable for seismic sensing.

9. The method for using a tubular seismic sensing cable for use in wells of claim 8 wherein said hollow core is then filled with compliant foam with desirable seismic properties to enhance seismic sensitivity.

10. The method for using a tubular seismic sensing cable for use in wells of claim 1 further providing a strength member interposed between said inner duct cable and said outer jacket.

11. The method for using a tubular seismic sensing cable for use in wells of claim 10 wherein said strength member is an epoxy or a gel polymer.

12. The method for using a tubular seismic sensing cable for use in wells of claim 1 wherein the material is cement.

* * * * *